United States Patent [19]

Kervagoret

[11] Patent Number: 5,244,260
[45] Date of Patent: Sep. 14, 1993

[54] AUTOMATIC BRAKING DEVICE FOR A VEHICLE

[75] Inventor: Gilbert Kervagoret, Argenteuil, France

[73] Assignee: Bendix Europe Services Techniques, Drancy, France

[21] Appl. No.: 13,112

[22] Filed: Feb. 1, 1993

Related U.S. Application Data

[63] Continuation of Ser. No. 740,273, Aug. 5, 1991.

[30] Foreign Application Priority Data

Sep. 28, 1990 [FR] France .................... 90 12015

[51] Int. Cl.⁵ .................................................. B60T 8/34
[52] U.S. Cl. ............................ 303/113.2; 303/115.4; 303/117.1
[58] Field of Search ............... 303/113.1, 113.2, 115.1, 303/115.4, 116.1, 116.2, 117.1, 119.1

[56] References Cited

U.S. PATENT DOCUMENTS

| | | | |
|---|---|---|---|
| 3,695,723 | 10/1972 | Stelzer | 303/115 PP X |
| 3,880,476 | 4/1975 | Belart et al. | 303/21 F |
| 3,985,309 | 10/1976 | Mayer | 303/115 PP X |
| 3,995,652 | 12/1976 | Belart et al. | 137/102 |
| 4,022,306 | 5/1977 | Sato | 192/3 |
| 4,574,908 | 3/1986 | Brick | 180/169 |
| 4,744,389 | 5/1988 | Ichihashi | 137/625.6 |
| 4,844,558 | 7/1989 | Ishii et al. | 303/116 R |

FOREIGN PATENT DOCUMENTS 0230213 10/1987 European Pat. Off.
0353125 1/1990 European Pat. Off.

Primary Examiner—Robert J. Oberleitner
Assistant Examiner—Lee W. Young
Attorney, Agent, or Firm—Larry J. Palguta; Ken C. Decker

[57] ABSTRACT

The invention relates to automatic braking device for a vehicle equipped with at least one fluid circuit connecting a master cylinder (10) to an application circuit including at least one brake motor (22) and comprising in addition a pump (30) capable of supplying to said application circuit via a non-return valve (31) fluid under high pressure taken from a low pressure reservoir (28). The device comprises, in combination, a proportional electrovalve connected to the application circuit and possessing of a regulating outlet (20), this electrovalve, at rest, closing a communication between the reservoir (28) and the feed entrance of the pump (30) and, when operating, opening this communication and regulating the pressure of the fluid in the application circuit and a comparison slide valve (16) which, when the pressure of the fluid in the master cylinder (10) is greater than or equal to that of the fluid in the application circuit, opens a communication between the master cylinder (10) and the application circuit and closes a communication between the regulating outlet (20) of the electrovalve and the reservoir (28), whereas it does the opposite in the opposite case.

2 Claims, 1 Drawing Sheet

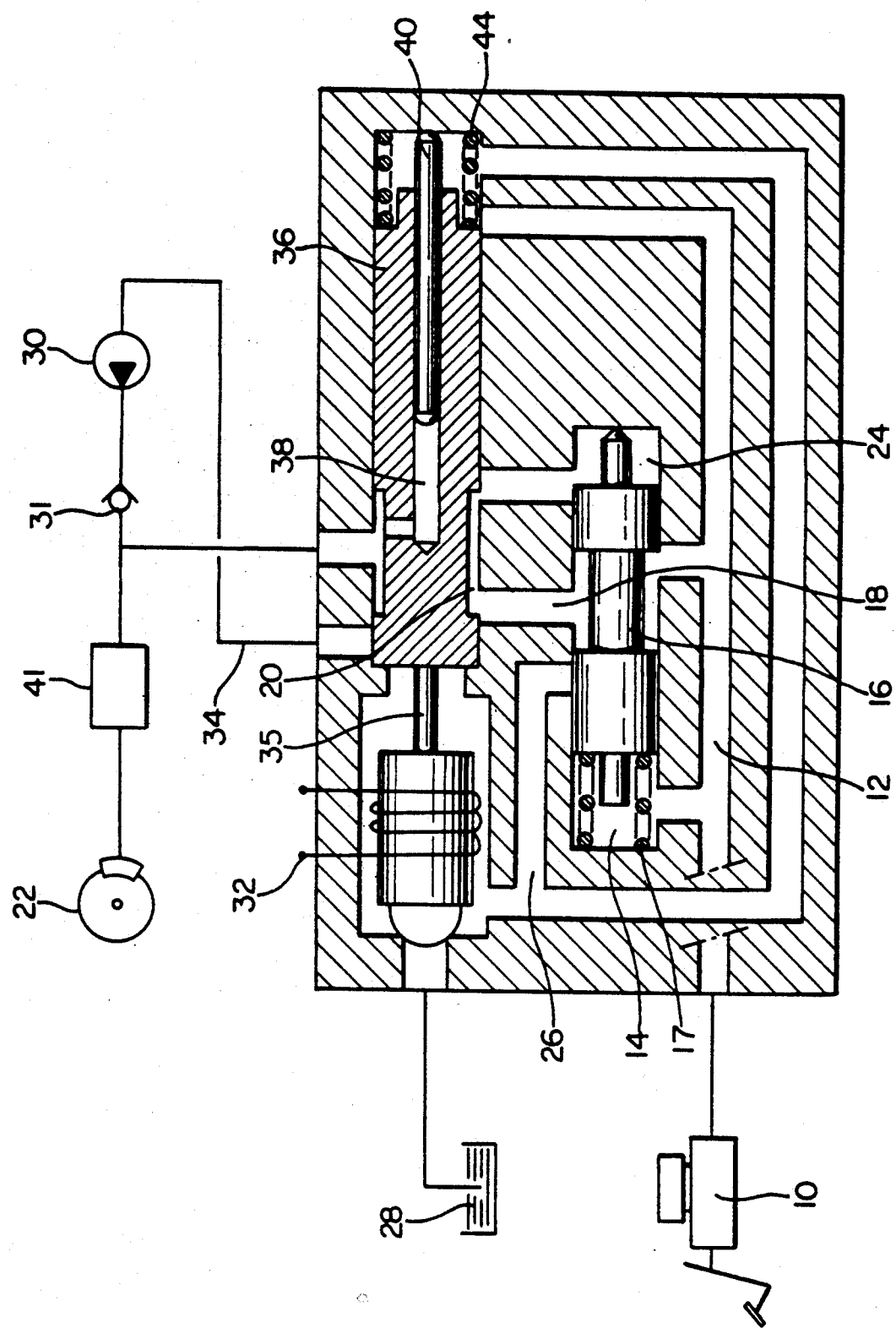

AUTOMATIC BRAKING DEVICE FOR A VEHICLE

This is a continuation of abandoned U.S. Pat. application Ser. No. 07/740,273 filed Aug. 5, 1991.

BACKGROUND OF THE INVENTION

The present invention concerns an automatic braking device for a vehicle equipped with at least one fluid circuit connecting a master cylinder to an application circuit including at least one brake motor and comprising, in addition, a pump capable of supplying to the brake motor fluid under high pressure taken from a low pressure reservoir.

Such a device finds many applications that a man skilled in the art will be easily able to combine. For example, it may be used in a vehicle fitted with a wheel antilock system to limit the pressure of the fluid in the brake motor to a value lower than or equal to that of the fluid in the master cylinder during the active operating sequences of the antilock system.

It may also be used to control braking automatically in response to a signal emitted for example by a beacon or by a radar detecting an obstacle. It may also be used to brake the driven wheels automatically when wheelspin is detected, notably when accelerating.

In every case, for obvious safety reasons, the driver of the vehicle so equipped must be able to brake his vehicle even if the device is in automatic operating mode.

Document U.S. Pat. No. A-4 799 570 describes a circuit allowing automatic control of braking on detection of an obstacle. However, this circuit does not allow all the functions described above to be provided.

SUMMARY OF THE INVENTION

The present invention has therefore the object of a device capable of providing all these functions.

According to the invention, the automatic braking device comprises, in combination, a proportional electrovalve connected to the application circuit and possessing a regulating outlet, this electrovalve, at rest, closing a communication between the reservoir and the feed entrance of the pump and, when operating, opening this communication and regulating the pressure of the fluid in the application circuit, and a comparison slide valve which, when the pressure of the fluid in the master cylinder is greater than or equal to that of the fluid in the application circuit, opens a communication between the master cylinder and the application circuit and closes a communication be&:ween the regulating outlet of the electrovalve and the reservoir, whereas it does the opposite in the opposite case.

BRIEF DESCRIPTION OF THE DRAWINGS

The invention will now be described by way of example to the accompanying drawings in which:

the sole Figure represents schematically in section an automatic braking device according to the invention.

DETAILED DESCRIPTION OF THE INVENTION

Now referring to this sole figure, a master cylinder, shown by 10, is connected to a passage 12. This passage 12 opens onto a chamber 14 sited to one side of a comparison slide valve 16 held in its rest position by a spring 17 in order to leave an open communication between this passage 12 and a passage 18 leading, via the regulating article or outlet 20 of a proportional electrovalve, to the brake motor 22 via an antilock device for the wheels 41. The motor 22 is likewise connected to the chamber 24 provided on the other side of the comparison slide valve 16. When this comparison slide valve 16 moves under the effect of the difference between the pressures prevailing in the chambers 14 and 24, it closes the communication between the passages 12 and 18 and opens a normally closed communication between the passages 18 and 26. This passage 26 is connected to the low pressure fluid reservoir 28.

A pump 30 is capable of supplying high pressure fluid to the brake motor 22 via a non-return valve 31. The feed entrance of the pump 30 is connected to the reservoir 28 via a passage 34 which is closed as long as the electrovalve is not operating.

In the diagram, this passage is doubly closed in order to avoid any leakage of the high pressure fluid toward the reservoir when the electrovalve is not actuated. This double closing is not however a necessity. Nevertheless, the normal braking circuit being of the hydrostatic type, total sealing is required between the master cylinder 10 and the reservoir 28.

The electrovalve comprises a solenoid 32 capable of creating a magnetic field intended to move the pushrod 35 of a slide valve 36 held in its rest position by a spring 44. A needle 40 immobile with respect to the body of the assembly penetrates into a bore provided in this slide valve 36 in order to define a reaction chamber 38. This latter chamber 38 is permanently in communication with the application circuit comprising the antilock device 41 and the brake motor 22. The slide valve 36 also provides the function of opening and closing the passage 34.

In normal braking, the pressure generated by the master cylinder is thus found in the brake motor 22 since the slide valve 16 remains in its rest position and since the electrovalve is not actuated. It is known that in the case of imminent locking of a wheel, the antilock device 41 operates in the usual way.

Now in automatic operation, that is to say in response to an external command, no pressure being generated by the master cylinder 10, the simultaneous activation of the pump 30 and the electrovalve provides communication between the feed entrance of the pump and the reservoir 28. The pressure prevailing in the brake motor 22, and thus in the chamber 24, obviously being greater than that prevailing in the master cylinder 10, and thus in the chamber 14, the comparison slide valve 16 moves, blocks the passage 12 and opens the intermediate communication between the passages 18 and 26. The regulation orifice 20 of the electrovalve is thus in communication with the reservoir 28, which allows the electrovalve to regulate in a controlled way the pressure in the brake motor 22. The antilock device for the wheels 41 stays in service in order to prevent any untimely locking of the wheels.

If, during this automatic braking period, the driver wishes to brake his vehicle further, a pressure is generated by the master cylinder 10 in the chamber 14. Once this pressure reaches a value close to that prevailing in the chamber 24, the comparison slide valve 16 returns to its rest position as shown and the passage 12 is opened again to the regulating orifice 20 and reaction chamber 38.

In order to regulate the pressure according to the signal received, the orifice 20 then opens farther which closes the between the feed entrance of the pump 30 and the reservoir 28. Thus the pressure created by the master cylinder 10 is applied to the brake motor 22.

This device, therefore, allows all the functions mentioned above to be carried out in complete safety. It especially offers the advantage, with respect to many known devices, of allowing a vehicle to be braked during a period of anti-spin, if the automatic functioning mode is provided to prevent the spinning of the driven wheels.

A person skilled in the art will easily be able to apply modifications to this device without leaving the scope of the invention, as defined by the attached claims.

What we claim is:

1. An automatic braking arrangement for a vehicle, comprising an application circuit including at least one brake motor, a pump connected to said application circuit, a reservoir of fluid selectively connected to the pump, a master cylinder selectively connected to the application circuit downstream of the pump, and a controllable device for selectively making connections between the master cylinder, pump, reservoir and application circuit, said controllable device comprising, in combination:

a proportional electrovalve arranged in a body comprising an inlet connected to the reservoir, an outlet connected to a feed entrance of the pump, and a regulating outlet connected to the application circuit downstream of the pump, said electrovalve, at rest, closing a communication between the reservoir and said feed entrance and when operating opening the communication and regulating the pressure of the fluid in the application circuit, and a comparison slide valve having a slide delimiting a first end chamber permanently connected to the master cylinder, a second end chamber permanently connected to said regulating outlet, and an intermediate chamber connected to the master cylinder and regulating outlet in a first position of the slide and connected to the reservoir and regulating outlet in a second position of the slide, said slide being in said second position when the pressure in the second end chamber is greater than the pressure in the first end chamber.

2. The arrangement according to claim 1, wherein the electrovalve comprises a slide provided with a bore in which is slidingly arranged a needle immobile with respect to said body, said bore being permanently in communication with said regulating outlet.

* * * * *